(No Model.)
O. McPHETERS.
DOUCHE PAN.
No. 499,643. Patented June 13, 1893.
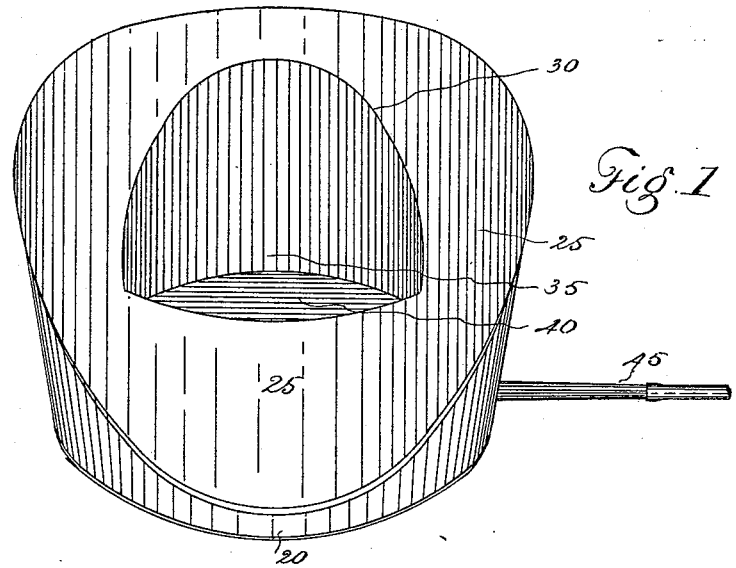
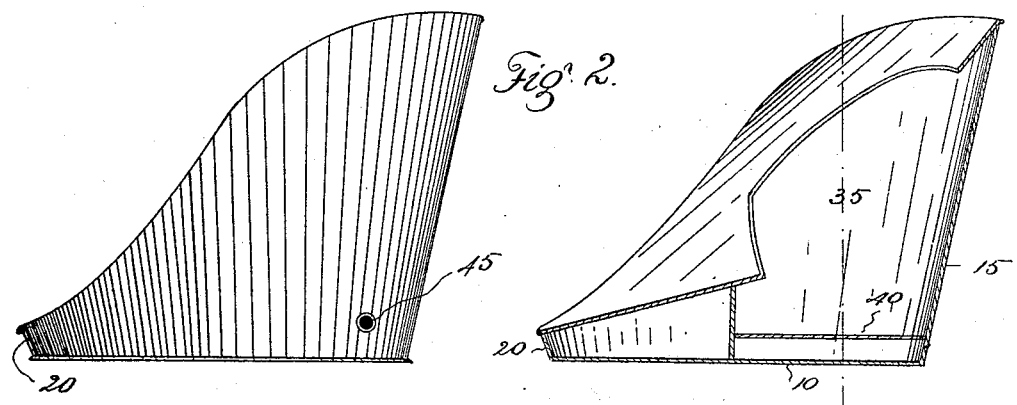
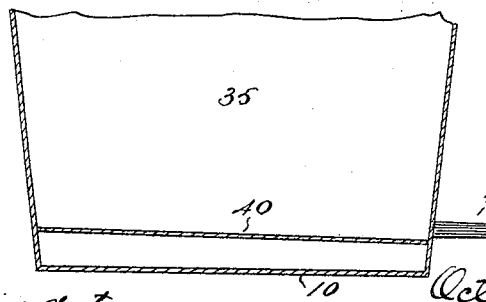
WITNESSES:
G. J. Rollandet.
Wm. M. Connell
INVENTOR
Octavia McPheters
BY A. J. O'Brien
ATTORNEY.

UNITED STATES PATENT OFFICE.

OCTAVIA McPHETERS, OF DENVER, COLORADO.

DOUCHE-PAN.

SPECIFICATION forming part of Letters Patent No. 499,643, dated June 13, 1893.

Application filed June 8, 1891. Serial No. 395,588. (No model.)

*To all whom it may concern:*

Be it known that I, OCTAVIA MCPHETERS, a citizen of the United States of America, residing at Denver, in the county of Arapahoe and State of Colorado, have invented certain new and useful Improvements in Douche-Pans; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in bed pans or vessels designed for use by invalids while in bed.

The object of the device is to support the body in a comfortable position while in use, and at the same time to permit the liquid evacuation to leave the pan through a suitable conduit leading to any suitable receptacle.

My invention will be fully understood by reference to the accompanying drawings wherein is illustrated an embodiment thereof.

In the drawings, Figure 1 is a front elevation of the device; Fig. 2, a side elevation thereof; Fig. 3, a vertical section taken through the center of the pan from the front to the rear; Fig. 4, a similar section partially broken away, taken on the line $x$—$x$, Fig. 3.

In the views wherein similar reference characters indicate corresponding parts let the numeral 10 designate the bottom of the pan, 15 the side walls which are highest in front and diminish by a gradual downward curve to the rear extremity 20 where the pan is quite thin and adapted to be easily slipped under the hips of the patient, while the more elevated forward portion affords a support for the lower limbs, which are comfortably bent at the knee joints. The top 25 surrounding the opening 30 is fashioned to afford an easy support for the engaging parts of the body. The receptacle or chamber 35 to which opening 30 leads is of suitable depth and provided with a bottom 40, which is raised from the bottom 10, thus allowing for the depth to which the pan will settle or sink into the bedding during use, the object being to have the bottom 40 of the chamber at all times above the surrounding surface of the bedding, so that the liquid contents of the pan may flow freely from the spout 45 which communicates with the interior of the chamber. In order to further facilitate the passage of the liquid contents of the pan through this spout, bottom 40 is highest on the opposite side of the chamber and made to slope downward toward the spout opening. This inclination of bottom 40 is illustrated in Fig. 4. Spout 45 is rigid but is connected with a flexible tube or conduit 50 which leads to any suitable receptacle so placed that the liquid in the pan may pass by gravity through the conduit to the receptacle.

Having thus described my invention, what I claim is—

1. As an improved article of manufacture a douche pan having the outer walls high in front to support the lower limbs when flexed, and low in the rear where the wall rises but little above the bottom, an inwardly projecting flange made fast to the upper edge of the wall, being widest in the rear and curved downwardly to form an easy support for the buttocks, an inner transverse vertical partition resting upon the true bottom and forming an inner support for the rear part of the top and a transversely inclined false bottom located in front of the vertical partition to which and the outer wall it is secured, the last named wall being provided with a suitable discharge opening just above the false bottom, substantially as described.

2. As an improved article of manufacture a douche pan having the outer walls high in front to support the lower limbs when flexed and low in the rear where the wall rises but little above the bottom, an inwardly projecting flange made fast to the upper edge of the wall, being widest in the rear and curved downwardly to form an easy support for the buttocks, an inner transverse vertical partition resting upon the true bottom and forming an inner support for the rear part of the top and a transversely inclined false bottom located in front of the vertical partition to which and the outer wall it is secured, and a rigid discharge spout leading from an opening formed in the outer wall just above the false bottom, substantially as described.

In testimony whereof I affix my signature in presence of two witnesses.

OCTAVIA McPHETERS.

Witnesses:
WM. MCCONNELL,
G. J. ROLLANDET.